United States Patent [19]
Horton

[11] Patent Number: 5,979,640
[45] Date of Patent: Nov. 9, 1999

[54] VIBRATING CONVEYOR DRIVE WITH CONTINUOUSLY ADJUSTABLE STROKE

[75] Inventor: William A. Horton, Jeffersonville, Ind.

[73] Assignee: Carman Industries, Inc., Jeffersonville, Ind.

[21] Appl. No.: 08/861,147

[22] Filed: May 21, 1997

[51] Int. Cl.⁶ .................................................. B65G 27/20
[52] U.S. Cl. ...................... 198/770; 198/752.1
[58] Field of Search ...................... 198/751, 761, 198/762, 763, 764, 766, 770

[56] References Cited

U.S. PATENT DOCUMENTS

| | | |
|---|---|---|
| Re. 29,512 | 1/1978 | Musschoot ............................. 198/770 |
| 3,226,984 | 1/1966 | Robins ............................. 198/770 X |
| 3,677,395 | 7/1972 | Musschoot . |
| 3,706,372 | 12/1972 | Musschoot . |
| 3,712,459 | 1/1973 | Musschoot et al. . |
| 3,750,866 | 8/1973 | Musschoot . |
| 3,776,352 | 12/1973 | Musschoot . |
| 3,789,977 | 2/1974 | Musschoot . |
| 3,796,299 | 3/1974 | Musschoot . |
| 3,848,343 | 11/1974 | Musschoot . |
| 3,882,996 | 5/1975 | Musschoot ............................. 198/770 |
| 4,088,223 | 5/1978 | Bertrand ............................. 198/761 |
| 4,131,193 | 12/1978 | Musschoot ............................. 198/533 |
| 4,140,215 | 2/1979 | Musschoot ............................. 198/771 |
| 4,152,255 | 5/1979 | Musschoot ......................... 198/753 X |
| 4,168,774 | 9/1979 | Musschoot ............................. 198/751 |
| 4,196,637 | 4/1980 | Barrot et al. ............................... 74/61 |
| 4,255,254 | 3/1981 | Faust et al. ......................... 198/770 X |
| 4,428,476 | 1/1984 | Kraus et al. . |
| 4,520,920 | 6/1985 | Ray ............................. 198/761 |
| 4,611,709 | 9/1986 | Kraus et al. ............................. 198/764 |
| 4,617,832 | 10/1986 | Musschoot ......................... 198/770 X |
| 4,768,647 | 9/1988 | Lertola ............................. 198/770 X |
| 4,775,284 | 10/1988 | Musschoot ......................... 198/550.01 |
| 4,844,236 | 7/1989 | Kraus ............................. 198/690.2 |
| 4,858,749 | 8/1989 | Musschoot ............................. 198/756 |
| 4,860,816 | 8/1989 | Bond ............................. 164/159 |
| 4,962,896 | 10/1990 | Robinson ............................. 241/266 |
| 5,040,666 | 8/1991 | Patel ............................. 198/760 |
| 5,054,606 | 10/1991 | Musschoot ............................. 198/751 |
| 5,056,652 | 10/1991 | Kraus et al. ............................. 198/760 |
| 5,064,053 | 11/1991 | Baker ............................. 198/753 |
| 5,123,516 | 6/1992 | Moore ............................. 198/396 |
| 5,131,525 | 7/1992 | Musschoot ............................. 198/770 |
| 5,178,259 | 1/1993 | Musschoot ............................. 198/753 |
| 5,392,898 | 2/1995 | Burgess et al. ......................... 198/750 |
| 5,404,996 | 4/1995 | Durnil ............................. 198/761 |
| 5,615,763 | 4/1997 | Schieber ............................. 198/751 |

OTHER PUBLICATIONS

Mitsubishi Electric instruction manual, U.S. version, for Freqrol–A200products entitled "Mitsubishi Transistorized Inverter".

Product brochure of Sumitomo Machinery Corporation for "SM–Cyclo Speed Reducers".

Contrex, Fenner Controls Division, M–Rotary User Manual, Rev F.

*Primary Examiner*—James R. Bidwell
*Attorney, Agent, or Firm*—Wood, Herron & Evans, L.L.P.

[57] ABSTRACT

A conveyor drive having a first crank (44) rotatably mounted to a base (24) for producing a first sinusoidal harmonic and a second crank (62) rotatably mounted to a conveying trough (22) for producing a second sinusoidal harmonic. A link (66) is connected between the first and second cranks (44, 62) to impart a first sinusoidal harmonic of the first crank (44) to the second crank (62). The second crank imparts a working displacement to the conveying trough (24) as a function of a phase relationship between the first and second sinusoidal harmonics of the respective eccentrics (44, 62). A synchronizer (FIG. 5) is operatively connected to the cranks (44, 62) for selectively adjusting the angular phase relationship between the first and second sinusoidal harmonics of the respective cranks (44, 62) to correspondingly vary the working displacement imparted to the trough (22), thereby controlling the speed of material being conveyed along the trough (22).

35 Claims, 7 Drawing Sheets

VIBRATING CONVEYOR DRIVE WITH CONTINUOUSLY ADJUSTABLE STROKE

FIELD OF THE INVENTION

This invention relates generally to the field of vibrating conveyors and, more particularly, to a new, simpler conveyor drive that permits the speed of material motion on the conveyor to be easily controlled and varied.

BACKGROUND OF THE INVENTION

Vibrating conveyors are often used to transport solid materials in and along a conveyor trough which is either generally horizontal, inclined or declined with respect to the conveying direction. Conveying troughs are oscillated at certain frequencies with amplitudes and directions of motion which are known to cause the desired material conveyances. The solid materials can be transported over distances of from several feet to several hundred feet. Longer vibrating conveyors, for example, those over forty feet, most commonly incorporate resonant frequency spring systems and are powered by displacement input drive systems, for example, crank arm assemblies, operating at or near the spring system resonant frequencies. Conveyors so constructed are known as resonant frequency vibrating conveyors and operate with reduced operating stresses and energy requirements.

Many vibrating conveyor applications require the ability to change the conveying speed of the material conveyance during the operation of the conveyor. In vibrating conveyor applications such as metering solid material, parts sorting and parts inspection, it is often desired to vary the material conveying speed during the operation of the conveyor.

One method for varying the material speed of a resonant frequency vibrating conveyor during its operation is to adjust the frequency of trough oscillation. This method is greatly limited because of the undesirable vibrations and stresses imparted to the vibrating conveyor apparatus when operated at frequencies substantially different from its resonant frequency.

Another method for varying the material speed during operation of a resonant frequency vibrating conveyor is to change the direction of oscillating motion. This requires changes to the resonant frequency spring systems and the displacement input drive system. The configuration of these systems are very costly to alter on a vibrating conveyor without compromising the strength and reliability of the apparatus.

A further method for varying the material conveying speed during conveyor operation is to change the amplitude of trough displacement. Varying the displacement of a displacement drive system is known, for example, one such vibrating conveyor construction is described in U.S. Pat. No. 5,404,996. Two cranks are mounted on a base, and a first crank arm is driven by a constant speed motor. The cranks are interconnected by sheaves and belts so that the motor driven crank arm provides power to the second crank arm. The interconnecting belts also extend around a mechanical phase angle adjustment plate which functions to vary the belt lengths interconnecting the crank arms, thereby varying the rotational phase between the crank arms. The distal ends of the crank arms are interconnected together by a linkage assembly that is also connected to the conveying trough. Changing the rotational phase angle between the crank arms changes the amplitude of displacement imparted to the conveying trough. The above device has a first disadvantage of requiring a complex linkage assembly interconnecting the crank arms and the trough. The oscillating motion of the crank arms is transmitted across four link elements and six pivot joints. The large number of pivot joints which are subject to wear during operation adversely impacts the cost and reliability of the conveyor drive. A second disadvantage to the system is the relatively complex phase angle adjustment mechanism that also has six rotating elements which are subject to wear during conveyor operation. Therefore, there is a need to provide a conveyor drive system for varying the and speed of material being conveyed along the conveyor utilizing a simple, reliable system having a minimum number of parts that are subject to wear and replacement.

SUMMARY OF THE INVENTION

The present invention provides a vibrating conveyor drive having a simple, reliable construction that can be used to vary the speed of motion of material along the conveyor.

In accordance with the principles of the present invention, and in accordance with the described embodiments, the conveyor drive has a first crank arm rotatably mounted to a base for producing a first angular displacement at a distal end of the first crank arm. A second crank arm is rotatably mounted to the conveying trough for producing a second angular displacement at a distal end of the second crank arm. A link arm is connected between the first and second crank arms to impart a first angular displacement of the first crank arm to the second crank arm. The second crank arm imparts a working displacement to the conveying trough as a function of a phase relationship between the first and second crank arms. A synchronizer is operatively connected to the first and second crank arms for selectively adjusting the angular phase relationship between the first and second crank arms to correspondingly vary the working displacement imparted to the conveyor, thereby controlling the speed of material being conveyed along the trough. The above conveyor drive structure is very simple with a minimum of parts and associated rotatable joints. Therefore, the above structure has the advantage of having minimal wear and maximum reliability.

In one aspect of the invention, each of the crank arms is connected to an electrically powered motor and the synchronizer is an electronic motor control for controlling the angular phase relationship between the two motors. In another aspect of the invention, the synchronizer is a mechanical linkage interconnecting the first and second crank arms to mechanically vary the angular phase relationship therebetween.

In another embodiment of the invention, a method is provided of operating a first motor connected to a first crank arm at a predetermined speed and producing first and second feedback signals from the first motor to a motor controller. The first feedback signal represents an angular position of the first crank arm and the second feedback signal represents the angular speed of the first crank arm. The method further includes operating a second motor connected to a second crank arm at a second predetermined speed and producing third and fourth feedback signals from the second motor to the motor controller. The third feedback signal represents an angular position of the second crank arm, and the fourth feedback signal represents the angular speed of the second crank arm. The synchronizer causes the second motor controller to operate the second motor at a speed to provide the desired angular phase relationship between the first and second crank arms, thereby imparting a displacement at a predetermined frequency to the conveying trough to convey the material along the conveying trough at a desired speed.

DETAILED DESCRIPTION OF THE INVENTION

Figure 1:
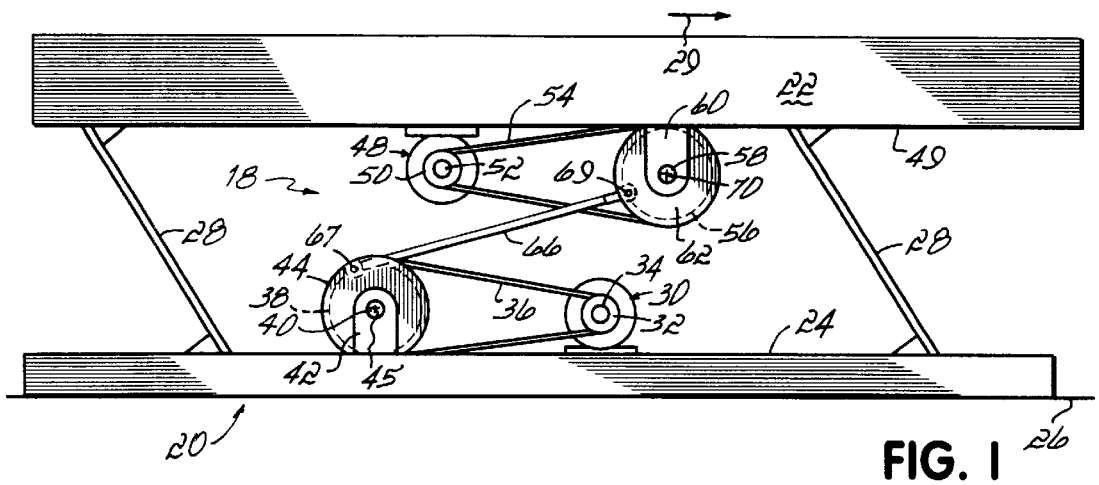
FIG. 1 is a schematic diagram of one embodiment of a conveyor with drive having a continuously adjustable stroke in accordance with the principles of the present invention.

FIG. 1 illustrates a vibratory conveyor drive 18 having a continuously adjustable stroke in accordance with the principles of the present invention. The conveyor 20 includes a conveying trough 22 that is resiliently supported on a base or support 24 that rests on a foundation or bearing surface 26 of a structure. The trough 22 is resiliently supported on the base 24 by a spring system 28 which may be leaf springs or any other resilient mechanical system that permits the conveying trough 22 to move in a desired direction with respect to the support base 24, thereby producing the desired conveying motion for the material on the conveying trough 22.

The conveyor drive system 18 includes a first motor 30 mounted to the base 24. A drive pulley 32 is connected to an output shaft 34 of the motor 30. The pulley 32 drives a belt 36 that is looped around a driven pulley 38 which, in turn, is connected to a shaft 40. The shaft 40 is rotatably mounted in two bearing assemblies 42 that are also rigidly connected to the base 24. A first eccentric or crank 44 is connected to and rotates with the shaft 40. The crank 44 has a point of eccentricity radially displaced from the axis of rotation 45.

A second motor 48 is mounted to the trough 22, preferably to a bottom surface 49 of the trough 22. The second motor 48 has a drive pulley 50 mounted to an output shaft 52 of the motor 48. The drive pulley 50 drives a belt 54 that in turn, rotates a driven pulley 56 that is rotatably mounted on shaft 58. The shaft 58 is rotatably mounted in two bearing assemblies 60 that are rigidly connected to the bottom of the conveying trough 22. A second eccentric or crank 62 is connected to and rotates with the shaft 58. The second crank 62 has a point of eccentricity radially displaced from the axis of rotation 70. One end of a link 66, preferably in the form of a connecting rod or shaft, is rotatably connected to an axle or pin 67 defining the point of eccentricity of the first crank 44. The other end of the link 66 is rotatably connected to an axle or pin 69 defining the point of eccentricity of the second crank 62.

As will be appreciated, if the second motor 48 is not running and held in a fixed angular position, the second crank 62 and other end of the link 66 will also be held in a fixed position. If the first motor 30 is started so that the crank 44 rotates, for example, in the counterclockwise direction, the rotation of the first crank 44 will force the shaft 58 and connected conveying trough 22 to move in a reciprocating motion. The maximum displacement of the conveying trough, that is, the amplitude of reciprocating motion, is approximately equal to twice the effective radius or eccentricity of the first crank. The effective eccentricity is the distance between the first axis of rotation 45 and the radial distance to the point of connection 67 of the one end of the link arm 66 to the first crank 44.

In the embodiment of FIG. 1, that reciprocating motion will, during one-half a revolution of the first crank 44 move the conveying trough 22 upward and to the right as viewed in FIG. 1. The material being conveyed in the conveying trough will experience the same motion as the trough. During the second half of the rotation of the crank 44, the conveying trough 22 moves downward and to the left as viewed in FIG. 1. However, during that period, the momentum imparted to the material being conveyed continues to move the material upward and to the right, thereby advancing the material to the right as viewed in FIG. 1. The resulting conveying speed of the material on the trough 22 is a function of the amplitude of trough reciprocating motion, the angle of the trough motion and the angular velocity of the crank 44.

In the single motor system described above, the amplitude and the direction of the trough displacement are fixed. Further, in order to obtain the energy saving benefits of a resonant spring system, the driving frequency, that is, the frequency of the vibrating force, must be maintained at or near the resonant frequency of the spring system. Therefore, for all practical purposes, the single motor system described above is a constant speed system with the disadvantage that the material conveying speed is fixed and cannot be changed.

Another disadvantage of the single motor system described above is that the motor 30 must be sized large enough to deflect the spring system initially and impart potential energy to the spring system to overcome the inertia of a motionless trough 22. In practice, for starting the conveyor, motor 30 is sized 2–3 times larger than what is required to maintain conveyor operation after motion has been established.

To overcome the above disadvantages of a single motor system, the present invention utilizes the second motor 48 and the second crank 62 which is connected to the first crank 44 by the connecting link 66. The operation of the first and second motors 30, 48, respectively, is controlled by an electronic synchronizing motor controller illustrated in FIG.

5 which will subsequently be described. The electronic motor controller of FIG. 5 has the capability of starting, running and stopping the motors 30, 48 in unison. The electronic motor controller further has the capability of permitting a desired a desired phase angle between the motor shafts to be selected and maintained.

Figure 2A:
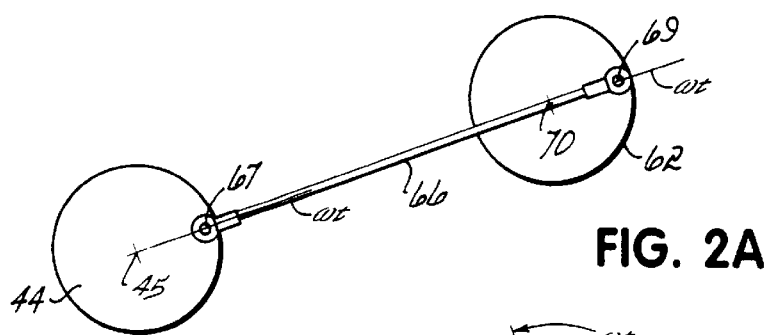
FIGS. 2A–2B illustrate a phase angle relationship between two cranks rotating in a common direction resulting in a zero trough displacement and a zero conveyor speed.
Figure 2B:
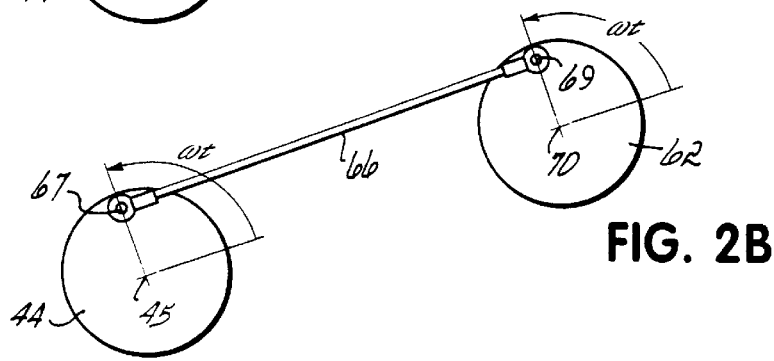
Figure 5:
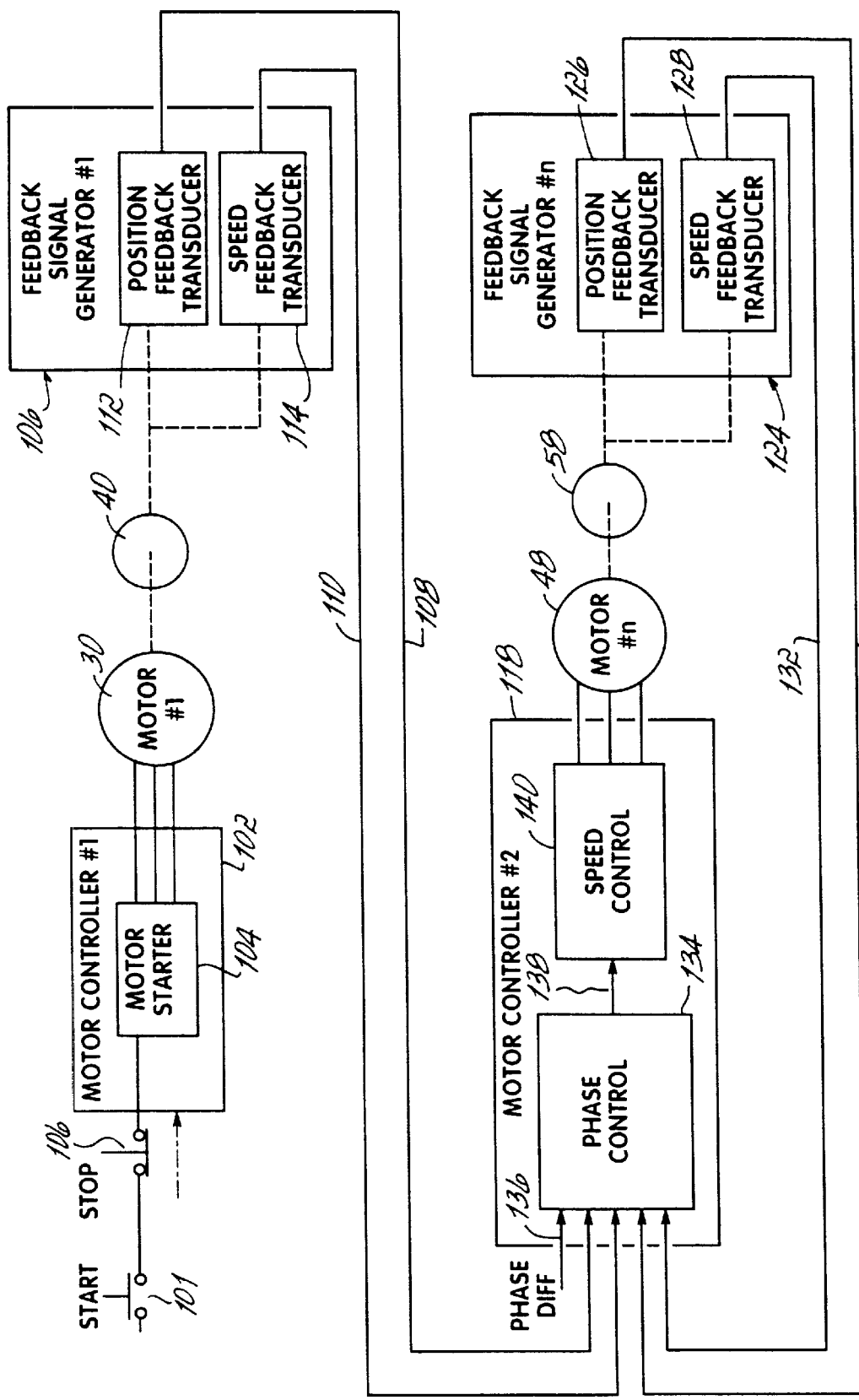
FIG. 5 is a schematic block diagram of an electronic synchronizing control for the conveyor drive of FIG. 1.

Using the synchronizer of FIG. 5, the relative rotations of the cranks 44, 62 are controlled to selectively vary the phase angle between the cranks, thereby selectively varying the magnitude of the displacement of vibration of the conveying trough 22. Referring to FIGS. 2A and 2B, the cranks 44 and 62 are illustrated to both be rotating counterclockwise and with identical angular positions. The distance between the respective axes of rotation 45, 70 remains constant over the rotation of the cranks 44, 62. The net result is that there is a zero displacement imparted to the conveying trough 22. Therefore, when the cranks 44, 62 are in phase and rotating in the same angular direction, the conveying trough 22 will not vibrate; and the material thereon will remain stationary regardless of the angular speeds of the cranks 44, 62. With no conveying load on the motors 30, 48, they are subject only to the friction of the drive system 18 and therefore, the energy required to start the conveyor is minimal. Hence, oversized motors are not required.

Figure 3A:
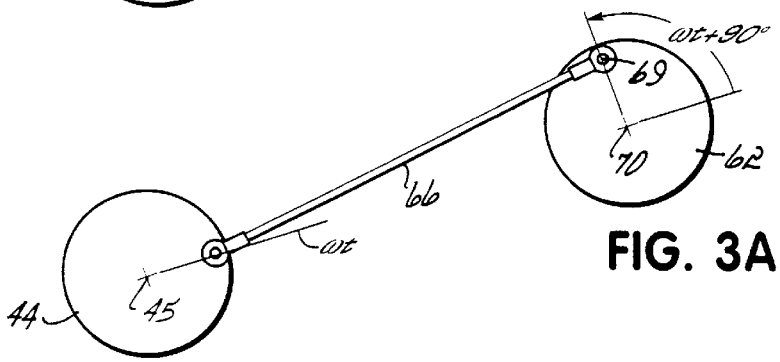
FIGS. 3A–3C illustrate a second phase angle relationship between the two cranks rotating in a common direction resulting in an intermediate trough displacement and an intermediate conveyor speed.
Figure 3B:
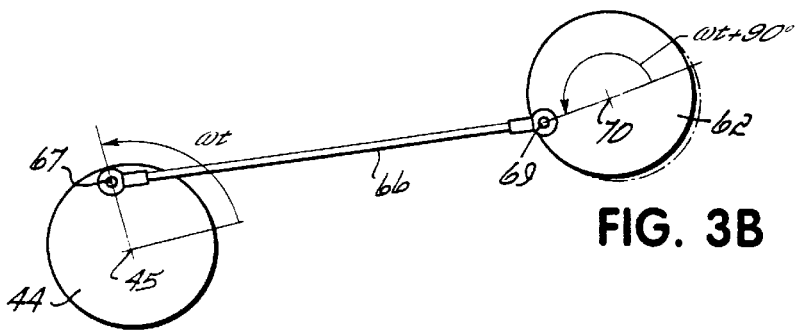
Figure 3C:
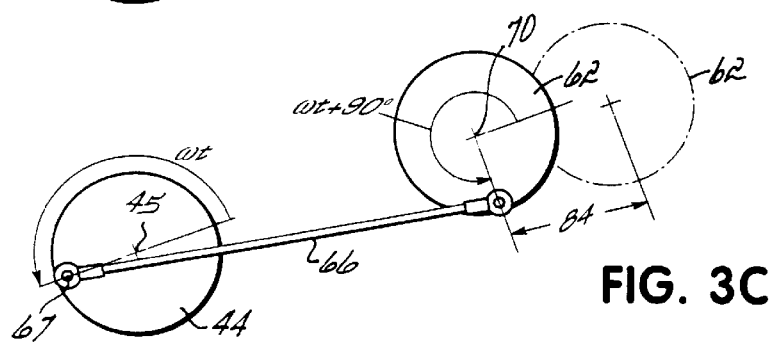

After the motors 30, 48 are accelerated to their desired operating speeds, the synchronizer may be used to selectively vary the phase angle between the cranks 44, 62. FIGS. 3A–3C illustrate different angular positions within one revolution of the cranks 44, 62 with the crank 62 being advanced in the counterclockwise direction 90° ahead of the crank 44, thereby providing a constant 90° phase angle difference between the cranks 44, 62 As shown in FIGS. 3A–3C, the combined rotations of the cranks 44, 62 are effective to pull the axis of rotation 70 of shaft 58 downward and to the left toward the axis of rotation 45 as shown in FIG. 3C and then return the axis of rotation to its original position as shown in FIG. 3A. Hence a specific amount of displacement is imparted to trough 22 which results in a conveying motion of the material on the trough. The displacement of the trough 22 is represented by the displacement 84 of FIG. 3C which is the distance between the position of the axis of rotation 70 after 180° of rotation and the original position of the axis of rotation 70 which is shown in phantom.

Figure 4A:
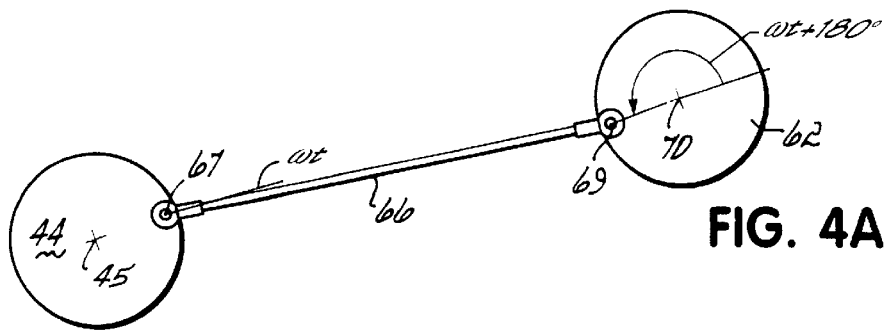
FIGS. 4A–4C illustrate a third phase angle relationship between the two cranks rotating in a common direction resulting in the maximum trough displacement and the maximum conveyor speed.
Figure 4B:
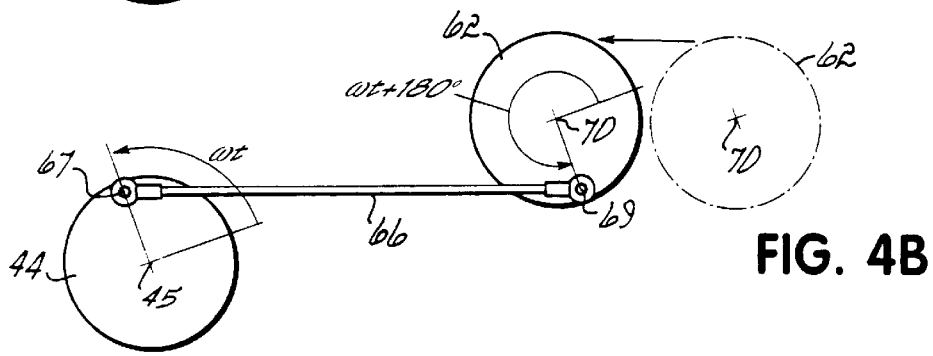
Figure 4C:
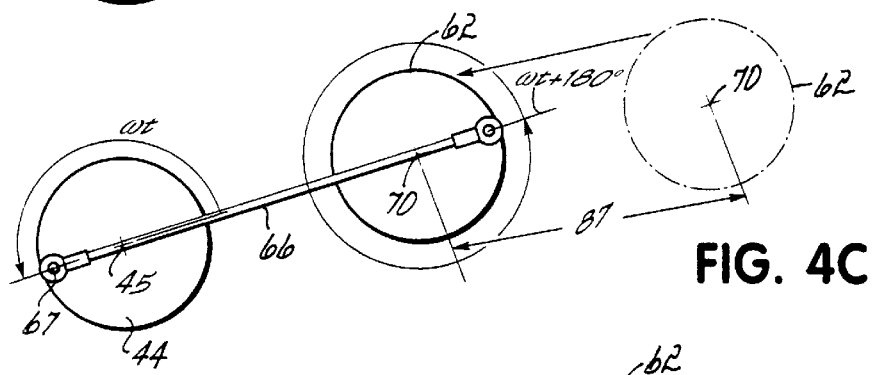

The amplitude of the input displacement to the trough 22 that defines the amplitude of the vibration stroke can be further increased by further increasing the angular position, that is, the phase angle, of the crank 62 with respect to the crank 44. As shown in FIGS. 4A–4C, if the phase angle is increased to a value of 180°; the input displacement 87 of FIG. 4C provided by the reciprocating motion of the axis of rotation 70 is at a maximum. Hence, with a phase angle of 180° between the cranks, the amplitude of trough displacement is at its maximum amount, which is equal to the sum of the eccentricities of the cranks 44 and 62; and a maximum material conveying speed is achieved.

Referring to FIG. 5, the present invention provides a motor control system that permits the phase angle between the motors 30 and 48 to be selectively varied, thereby selectively varying the input displacement to the conveyor and hence the conveying speed of the material on the conveyor. The first motor 30 is preferably an induction AC motor. A start switch 101 applies a start signal to a motor controller 102 which contains a start circuit 104 that applies full line voltage to the motor 30. A feedback signal generator 106 is responsive to the operation of the rotating shaft, 40 (FIG. 1) to provide on output line 108 a position feedback signal representing the angular position of the rotating shaft 40. The feedback signal generator 106 provides a second feedback signal on output line 110 representing the speed of the rotating shaft 40.

The feedback signal generator 106 includes a position feedback transducer 112. The position feedback transducer 112 is mounted adjacent to the shaft 40 at a position to detect a physical characteristic during shaft rotation. The position feedback transducer 112 may be an encoder, a proximity switch, or any other position transducer that produces a position feedback signal on output line 108 representing the angular position of the shaft 40, that is, each time shaft 40 passes a predetermined reference position within one revolution. For example, in the angular position illustrated in FIG. 1 or at any other angular position, the position transducer 112 may detect the edge of a key or keyway, an edge of the crank 44, or a reference marker that is attached to the rotating shaft 40. Therefore, with each revolution of the shaft 40, a first feedback signal in the form of a pulse or a change of state is produced on the output line 108.

The feedback signal generator 106 further includes a speed feedback transducer 114 which can be an encoder, a tachometer or any other device for measuring the speed of the rotating shaft 40. For example, the speed transducer 114 can be a gear (not shown) with peripheral teeth mounted to the shaft 40. A proximity sensor (not shown) mounted adjacent the ring gear produces an electrical pulse on the output line 110 each time a tooth passes the sensor. Therefore, the second feedback signal is a pulse train having a frequency that is proportional to the angular speed of the shaft 40.

The second motor 48 is operated by a motor controller 118. The motor 48 is also connected to a feedback signal generator 124 which is comprised of a position transducer 126 and a speed transducer 128. Preferably, the position transducer 126 is identical in construction and operation to the previously described position transducer 112 and, is connected to the rotating shaft 58. The position transducer 126 produces on output line 130 a position feedback signal representing angular position, for example, a pulse or a change of state that represents the rotating shaft 58 passing a predetermined reference position during each revolution, for example, the illustrated angular position of the rotating shaft 58. Similarly, the speed transducer 128 is identical in construction and operation to the previously described speed transducer 114 and is connected to the rotating shaft 58. The speed transducer 128 produces a speed feedback signal on output line 132 in the form of a train of pulses having a frequency that is a function of the angular speed of the shaft 58.

The motor controller 118 includes a phase control 134, for example, an M-Track Motion Controller commercially available from Fenner Controls Division of Maple Grove, Minn. The phase controller 134 has inputs connected to the position and speed feedback signals on output lines 108, 110, respectively, which represent the operation of the motor 30 and the rotating shaft 40. In addition, the phase control 134 has other inputs responsive to the respective position and speed feedback signals on lines 130, 132 which represent the operation of the motor 48 and rotating shaft 58. The phase control 134 has a further input 136 which permits a desired phase relationship between the rotating shafts, that is, the difference in the angular positions of the shafts 40 and 58, to be selected. Therefore, the phase control input 136 is used to vary the material conveying speed. The phase control 134 utilizes the feedback signals representing both the angular speed of motors 30, 48 and the relative rotations of shafts 40, 58 to provide a speed control signal on line 138 to a speed control 140. The speed control 140 responds to the speed control signal to operate the motor 48 at a speed identical to the speed of motor 30 and with the desired phase difference between the shafts 40, 58. The speed control 140 is, for example, the "FREQROL"-A-200 Transistorized Inverter commercially available from Mitsubishi Electric of Chicago, Ill. While a variable frequency inverter is the preferred speed control, other known electronic speed controls may be used.

The motor controller 118 is effective to electronically synchronize the speeds of motors 30, 48 and the phase of the rotating shafts 40, 58 during the full time the power is applied to the motors. Further, that synchronization process occurs almost immediately after power is applied to the motors 30, 48. With the electronic synchronization provided by motor control 118, the rotating shafts 40, 58 accelerate in a continuously synchronized state. Further, since full voltage is being applied to the motor 30, the motors 30, 48 reach their full speed in the minimum amount of time. In a similar manner, the electronic synchronization of the motors 30, 48 is maintained through a deceleration phase from full speed to stop.

In use, to start the conveyor, the set phase input 136 of the phase control 134 is set to zero. The start switch 101 is pushed, which provides a start signal to the motor controller 102, thereby applying power and starting the motor 30. The shaft 40 begins rotation immediately upon the motor 30 being turned on, and the feedback signal generator 106 provides feedback signals to the motor controller 118 as a function of the rotation of shaft 40. The motor controller 118 then applies power to the motor 48, which, in turn, rotates the shaft 58. The motor controller 118 causes the motor 48 to follow the acceleration of motor 30 up to the desired speed. Assuming the motors have the same direction of rotation with a zero phase difference, cranks 44, 62 will produce two sinusoidal harmonic displacements that are identical and synchronized with each other. The cranks will follow the paths illustrated in FIGS. 2A and 2B, and the distance between the rotating shafts 40, 58 will remain constant. Any displacement that the first crank 44 imparts to the second crank 62 is offset by the angular motion of the second crank 62, so that there is no working displacement or vibration imparted to the conveyor trough 22. Therefore, in the no-load condition, the motors 30, 48 and respective cranks 44, 62 are accelerated from rest to the desired operating speed in a minimum period of time.

As long as the phase difference between the cranks 44, 62 is held at zero during the acceleration phase, the motors, 30, 48 can be accelerated smoothly up to their desired and selectable speed with the only load thereon being the frictional load within the drive system 18. This characteristic has several advantages. First, the motors may be reduced in size because they are no longer required to generate enough torque to deflect the entire conveyor resonant spring system 28 to maximum deflection in the first one-quarter rotation. Second, a reactive counterbalance vibrating conveyor with a conventional crank arm drive usually experiences large transient oscillations in the isolation springs as the drive accelerates from rest position to normal operating speed. As the operating speed approaches the isolation spring resonant frequency, conveyor isolations are greatly magnified by the isolation springs. These large amplitudes may cause damage to adjacent objects before eventually dying out as the conveyor drive continues to accelerate to its normal operating speed. By accelerating the drive to operating speed with zero trough amplitude, the conveyor experiences no harmful transient oscillations as the drive accelerates through the isolation spring resonant frequency. This same advantage is also available when the conveyor is brought to a stop. If an operating conveyor is simply turned off, the conveyor drive will gradually coast down to a stop. As the drive speed passes through the isolation spring resonant frequency, large, transient amplitudes can develop. If, with the present invention, the conveyor trough amplitude is reduced to zero with the drive operating at normal speed, then the conveyor motor can be de-energized; and the drive will coast to a stop without generating large, transient amplitudes.

If the conveyor is to be operated in the resonant frequency mode, the desired speed of the motors 30, 48 is set at or near the resonant frequency of the spring system 28. To initiate motion of material in the direction 29 along the conveying trough 22, the set phase input 136 is adjusted to select a phase angle such that the angular position of the crank 62 is changed with respect to the crank 44. Therefore, the sinusoidal harmonic produced by the rotation of the first crank 44 will be imparted to the second crank 62. The sinusoidal harmonic produced by the rotation of the second crank 62 will, as a function of its phase relationship with the first crank 44, impart a working displacement to the conveying trough. Therefore, using the set phase input 136, the speed of material conveyance along the trough 22 is adjustable between zero and a maximum speed at which the crank 62 is advanced in phase 180° with respect to the crank 44. As the crank 62 is advanced in phase in the direction of rotation, the distance between the shafts 58 and 40 increases, thereby increasing the amplitude of the working displacement imparted to the conveying trough 22 by the drive 18 and the speed of material conveyance. As the phase of the crank 62 is advanced past and in excess of 180°, the maximum distance between the shafts 58, 40 lessens, thereby reducing the amplitude of the input displacement to the conveyor trough 22. Consequently, the speed of material conveyance along the trough 22 slows down.

Figure 6A:
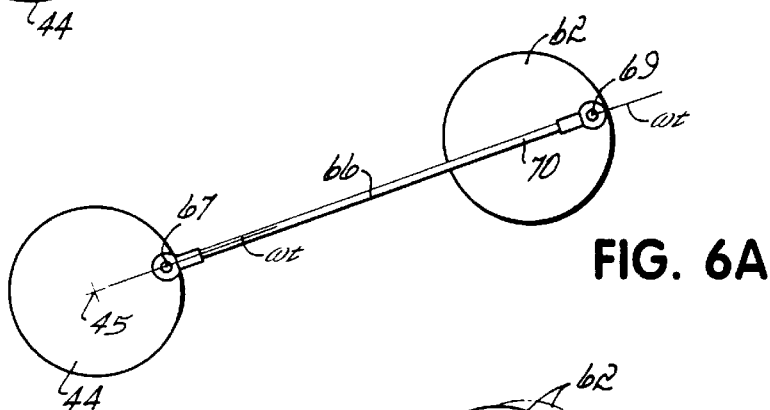
FIGS. 6A–6B illustrate a phase angle relationship between two cranks rotating in opposite directions resulting in a zero conveyor speed.
Figure 6B:
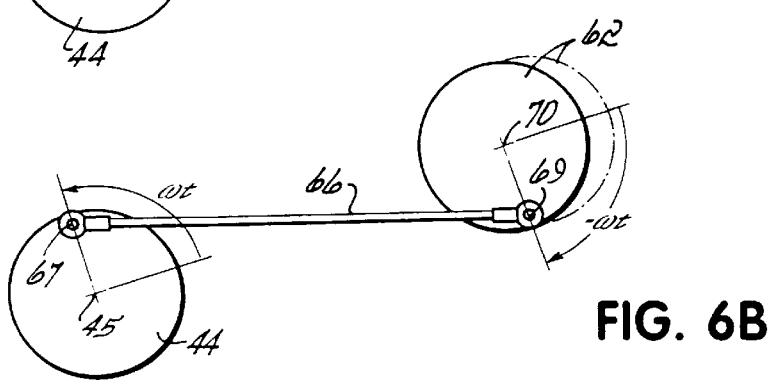
Figure 7A:
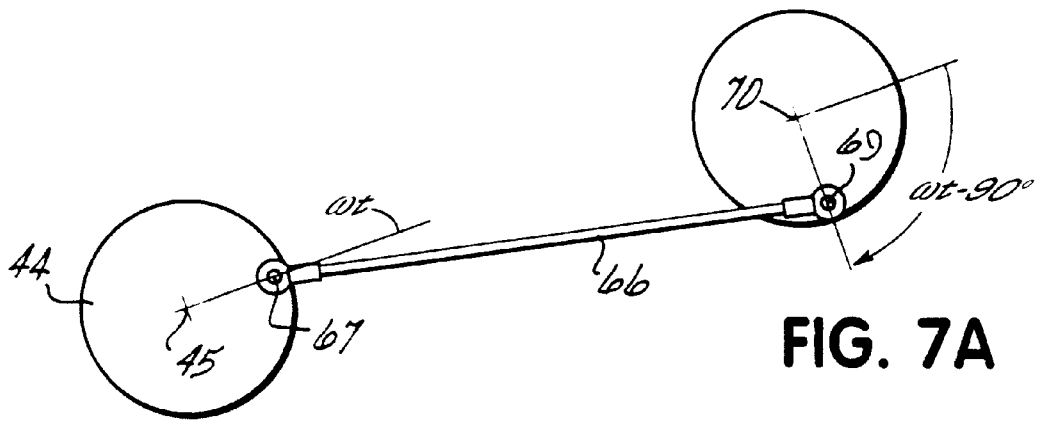
FIGS. 7A–7C illustrate a second phase angle relationship between the two cranks rotating in opposite directions resulting in an intermediate conveyor speed.
Figure 7B:
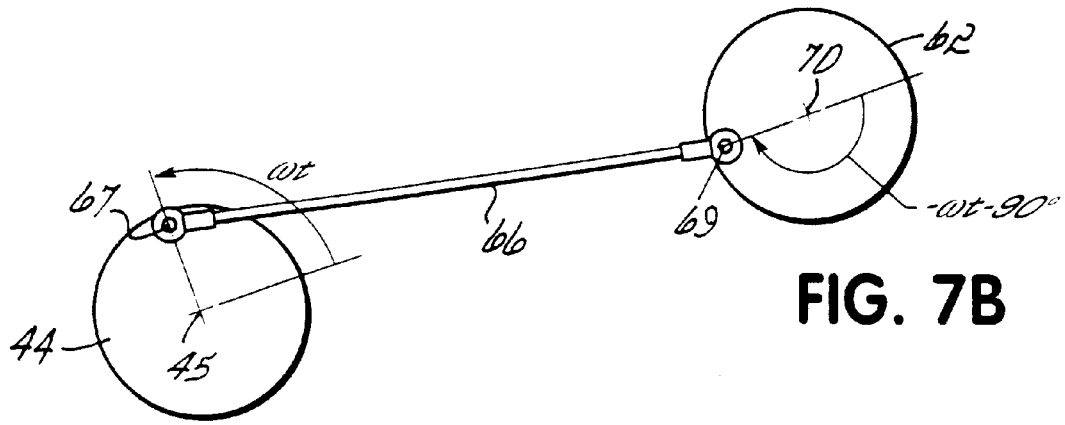
Figure 7C:
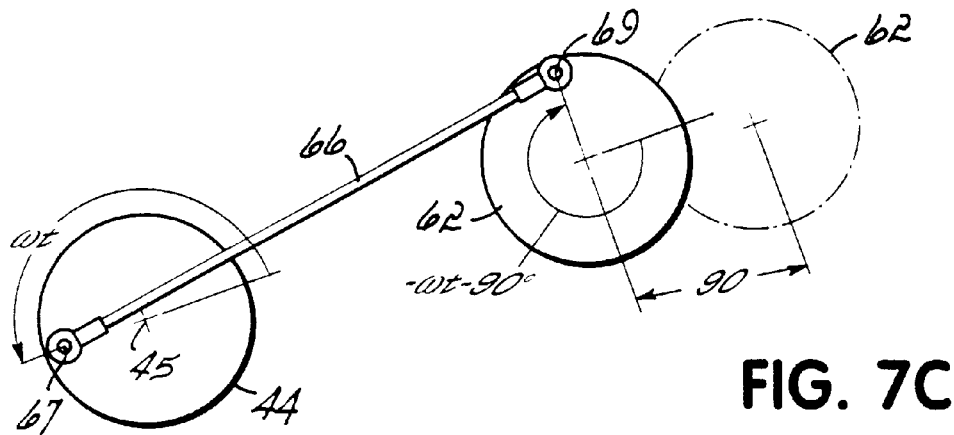
Figure 8A:
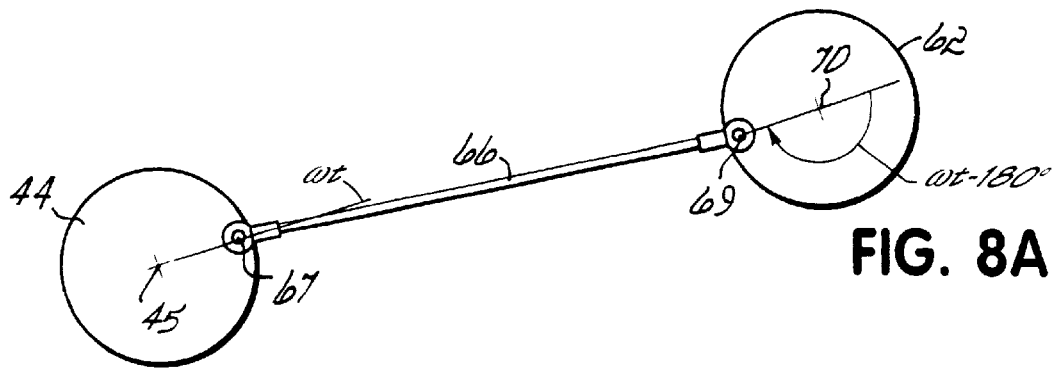
FIGS. 8A–8C illustrate a third phase angle relationship between the two cranks rotating in opposite directions resulting in a greater conveyor speed.
Figure 8B:
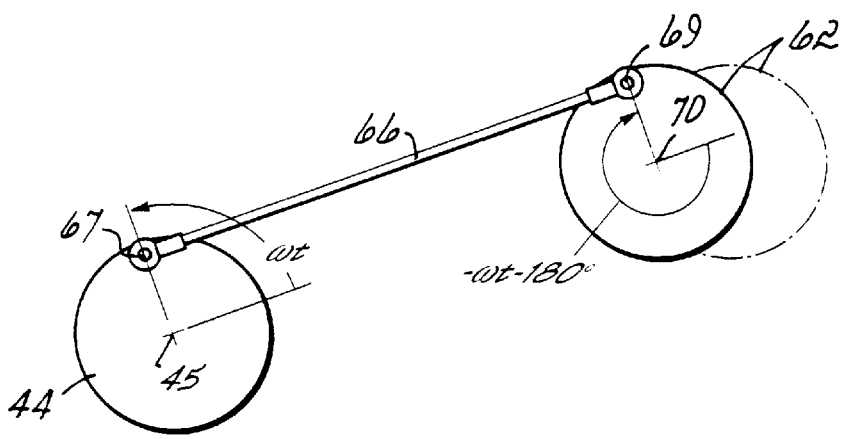
Figure 8C:
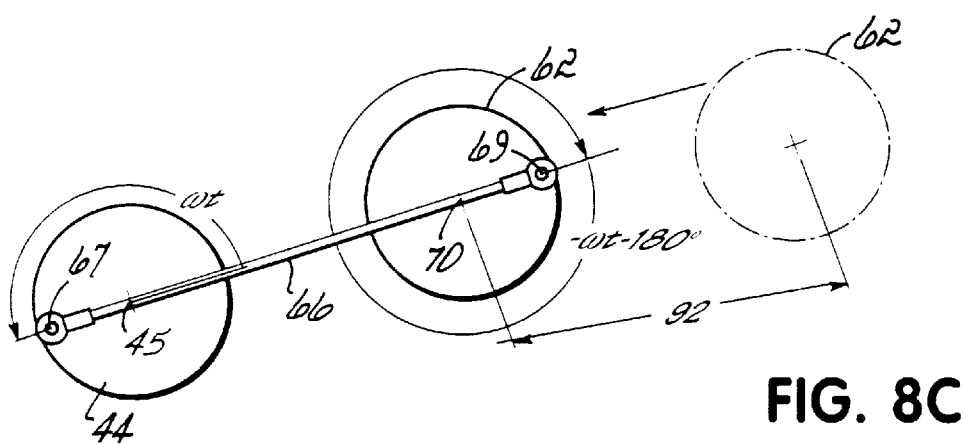

FIGS. 6–8 illustrate an alternative embodiment of the invention in which the cranks 44, 62 are rotating in opposite directions, for example, the crank 44 is rotated in the counter-clockwise direction, and the crank 62 is rotated in the clockwise direction. As shown in FIGS. 6A–6B, with a zero phase difference between the counter-rotating cranks 44, 62, the axis of rotation 70 moves through a small displacement relative to the axis of rotation 45; and the conveyor trough 22 experiences a minimal vibration. However, as illustrated in FIGS. 7A–7C, a 90° phase lag of the crank 62 with respect to the crank 44 results in a conveyor vibration having a displacement 90 (FIG. 7C). Similarly, as illustrated in FIGS. 8A–8C, if the crank 62 lags the crank 44 by 180°, the conveyor trough 22 is vibrated through a displacement 92 (FIG. 8C).

Figure 9:
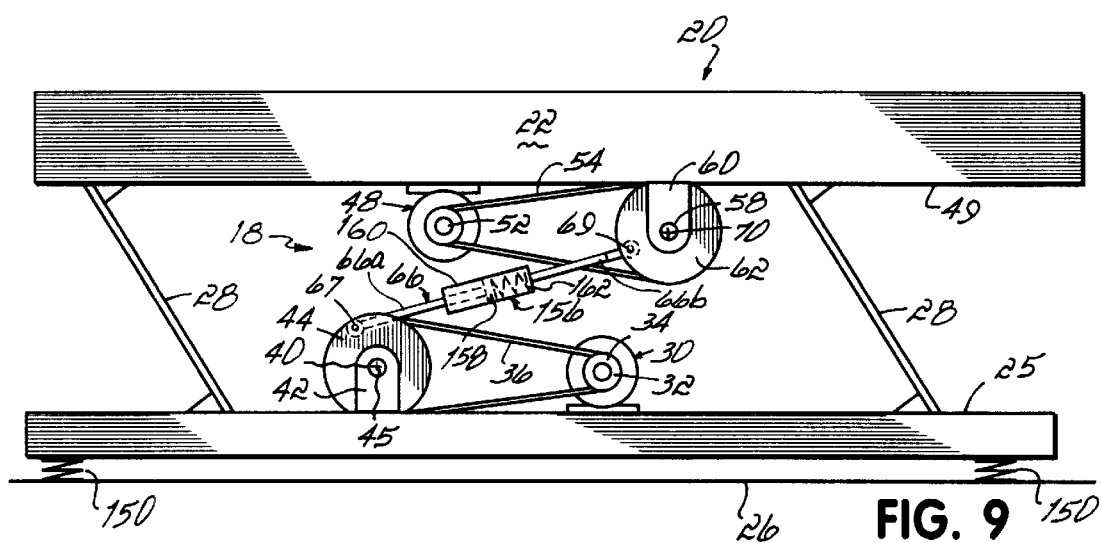
FIG. 9 is a schematic diagram of another embodiment of a conveyor with drive having a continuously adjustable stroke in accordance with the principles of the present invention.

FIG. 9 illustrates an alternative embodiment of the invention. The structure of FIG. 9 is similar to that of FIG. 1 except that the conveyor is no longer rigidly fixed to the floor 26. Instead, it is supported off the floor by several resilient members, that is, isolation springs 150. These isolation springs are shown supporting the conveyor under a reactive counterbalance member 25, but may, just as well, support the conveyor from under the trough 22, from a convenient attachment point on the conveyor spring system 28, or from some combination of the above. Such isolation springs 150 may be desirable to reduce the vibration forces associated with the conveyor that are transmitted into the floor 26 on which the conveyor rests. The isolation springs 150 function in a known manner to reduce these vibration forces approximately in a range of from approximately 70% to approximately 85%.

In addition, the conveyor drive system of FIG. 9 has a second spring system 156 located between the cranks 44, 62. The link 66 is split into two connecting arms 66a and 66b which have first ends connected to the points of eccentricity 67, 69. The adjacent other ends of the arms 66a, 66b are connected to the spring system 156. In one embodiment, the other end of arm 66a is connected to piston 158, and the other end of arm 66b is connected to cylinder 160. The ends of spring 162 are connected to piston 158 and cylinder 160. The spring 162 is sized to maintain piston 158 centered within cylinder 160 when no forces are being applied to the spring 162, and the spring is designed to operate in response to both compression and tension forces being applied to its ends. The purpose of the spring system 156 is to provide cushioning to the drive components to reduce wear and stress during operation. The spring 162 is preferably made of elastomers, such as neoprene or 'EPDM" rubber, or coiled steel alloys and is configured and designed to provide specific resistance to forces in a direction generally perpendicular to the respective axes of rotation 67, 69. As will be appreciated, the spring system 156 may be implemented with other systems, for example, springs may be placed on both sides of the piston 158. Alternatively, the ends of the connecting link 66 may be connected to the points of eccentricity 67, 69 using resilient bushings.

Figure 10:
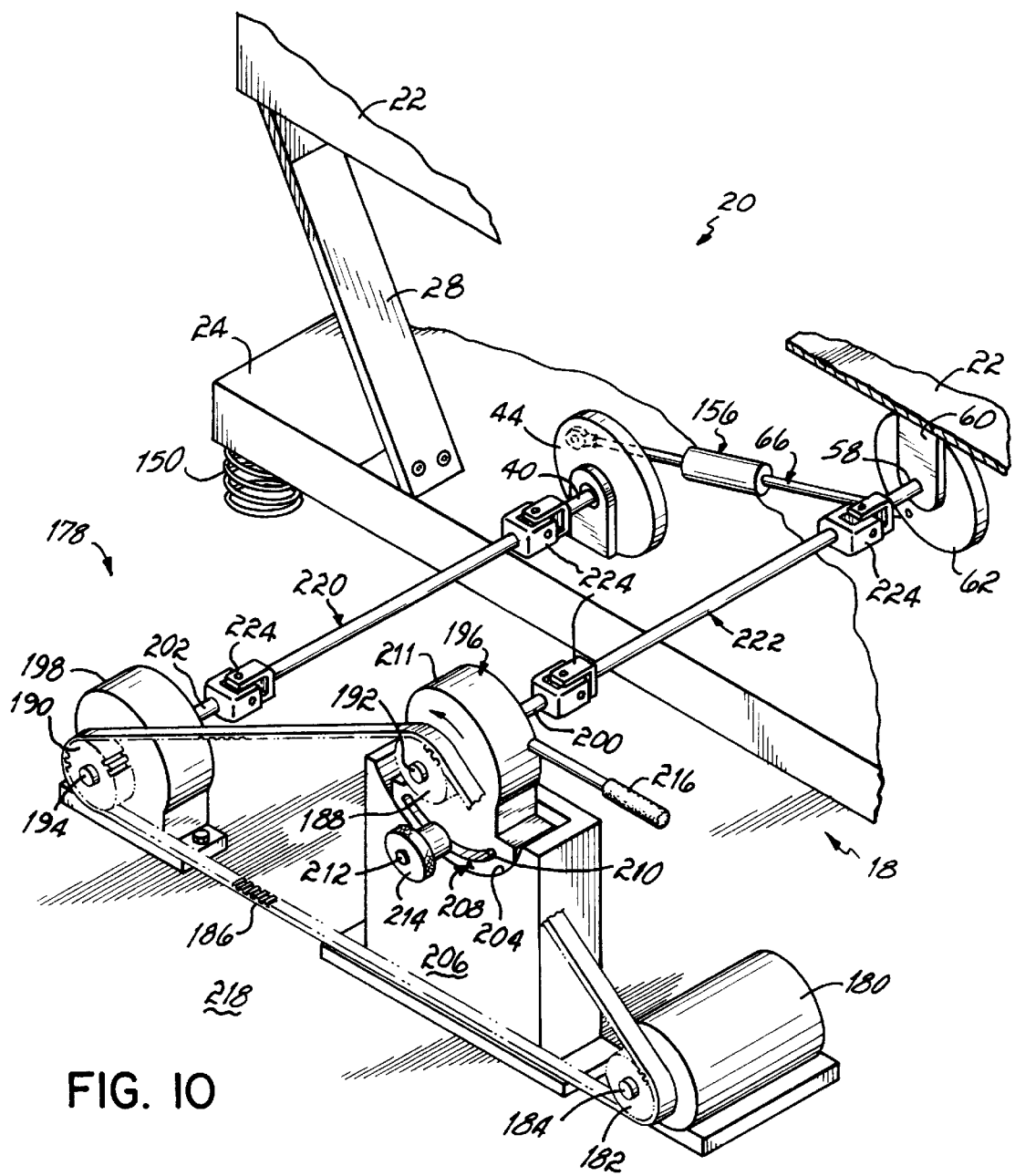
FIG. 10 is a schematic diagram illustrating a mechanical phase angle adjustment mechanism in accordance with the principles of the present invention.

In the embodiments described above with respect to FIGS. 1 and 9, the phase angle between the rotating eccentrics 44, 62 and their respective motors 30, 48 are electronically controlled using the motor control circuits illustrated in FIG. 5. Alternatively, the phase angle between the rotating eccentrics 44, 62 may be varied using a mechanical phase angle adjustment system 178 as illustrated in FIG. 10. In this embodiment, a motor 180 has a geared pulley 182 connected to its output shaft 184. A gear belt 186 extends in a continuous loop around, the geared pulley 182, geared pulley 188, and geared pulley 190. The geared pulleys 188 and 190 are connected to input shafts 192, 194 of respective speed reducers 196, 198. Output shafts 200, 202 of the respective speed reducers 196, 198 are normally concentric with the respective input shafts 192, 194; and further the output shafts 200, 202 are connected to the shafts 58, 40 that rotate respective eccentrics or cranks 62, 44. The speed reducers may, for example, provide a three to one speed reduction and the pulley and belt system may reduce the speed by another twenty-five percent.

In the embodiment illustrated in FIG. 10, the motor 180 is rotating in a counter-clockwise direction, thereby rotating the speed reducers 196, 198 and their respective cranks 62, 44 in the counter-clockwise direction. For a given phase relationship between the eccentrics 44, 62 interconnected by link 66, the trough 22 will be vibrated through an amplitude to move material on the trough at a desired speed. In order to change the phase angle between the eccentrics 44, 62, the speed reducer 196 is mounted such that its housing is rotatable about the concentric input and output shafts 192, 200. For example, the speed reducer 196 is schematically shown mounted in a cradle 204 such that it may be rotated with respect to a mounting structure 206. Further, to control the degree of rotation, the speed reducer 196 has a flange 208 with an arcuate slot 210. A screw 212 mounted to the base 206 extends through the slot 210 of the flange 208. A locking nut 214 is threaded over the screw 212 to clamp the flange 208 in a fixed position with respect to the base 206, thereby clamping the speed reducer 196 in a desired rotational position. The speed reducer 196 further has a lever arm 216 connected to its housing to facilitate its rotation.

To change the phase relationship between the eccentrics 44, 62, the lock nut 214 is loosened, thereby permitting the speed reducer 196 to be rotated. The handle 216 is manipulated to effect a rotation of the speed reducer housing 211 with respect to its concentric input and output shafts 192, 200. As the housing 211 of the speed reducer 196 is rotated, the internal gearing, which is mounted to housing 211, will also rotate; thereby causing output shaft 200 to undergo a rotation, which is distinct and separate from the rotation caused by rotating input shaft 192. The magnitude of the additional rotation of output shaft 200 is a function of the gear reduction ratio within the speed reducer 196. By rotating speed reducer housing 211, the phase angle between the output shaft 200 and output shaft 202 changes proportionally. That, in turn, changes the phase angle between the eccentrics 44, 62 and the amplitude of the vibration stroke into the conveyor 22, thereby changing the speed of material being moved along the conveyor 22. Graduations may be provided on the flange 208 along the slot 210 representing the angular phase difference between output shafts 200 and 202 with respect to the stationary screw 212; or the flange 208 may be otherwise calibrated as appropriate. When the desired phase angle relationship is achieved, the locking nut 214 is tightened, thereby locking the housing 211 in place with respect to the mounting support 206 and preventing further rotation thereof.

Preferably, the phase angle adjustment mechanism 178 is housed as a unit and mounted on a floor or other surface 218. As will be appreciated, the shaft 58 and eccentric 62 will be vibrating and moving with the trough 22 relative to the stationary output shaft 200 of speed reducer 196. Further, if the base 24 is mounted on isolation springs as illustrated in FIG. 9, the shaft 40 of eccentric 44 will be moving relative to the output shaft 202 of speed reducer 198. Therefore, normally, shafts 40, 58 are connected to their respective output shafts 202, 200 by flexible drive shafts 220, 222, respectively. The flexible drive shaft 220 may be of a known design that, for example, includes universal couplings 224 interconnecting the ends of shaft 220 with the output shaft 202 and the driven shaft 40. Similarly, the ends of flexible drive shaft 222 are interconnected by universal couplings 224 to the output shaft 200 and driven shaft 58.

While the invention has been set forth by a description of the preferred embodiment in considerable detail, it is not intended to restrict or in any way limit the claims to such detail. Additional advantages and modifications will readily appear to those who are skilled in the art. For example, the conveyor drive system thus far described utilizes motors 30, 48 having a common direction of rotation with their respective shafts 40, 58. Alternatively, a motor can rotate in one direction, but be mechanically coupled to its respective shaft, so that the shaft rotates in the opposite direction.

The cranks 44, 62 are illustrated and described as being connected to the rotating shafts of 40, 58. As will be appreciated, the cranks 44, 62 may also be directly connected to the respective output shafts 34, 52 of the motors 30, 48, respectively. Further, the feedback generators 106, 124 described as connected to the shafts 40, 58 may alternatively be coupled directly to the output shafts 34, 52 of the respective motors 30, 48.

The embodiment is described as being applicable to a resonant spring system, however, as will be appreciated, the conveyor drive system is also applicable with its various advantages to conveyors that do not utilize a resonant spring system.

The preferred embodiment illustrates the second motor 48 and crank 62 mounted on a lower surface of the conveying trough 22. As will be appreciated, the motor 48 and associated crank 62 may be mounted on a side surface of the conveying trough 22, or may be mounted on brackets projecting from any portion of the conveying trough 22 in a manner that the crank 62 interconnects by a link 66 to the first crank 44. Similarly, the mounting location of the first motor 30 and associated crank 44 may be moved from its preferred illustrated and described position to other locations on the support base 24, as well as brackets extending from the support base 24.

In alternative embodiments of FIG. 10, the motor 180 may rotate in the opposite direction. Further, instead of mounting the phase control system 178 on the ground 218 separate from the conveyor 20, the phase control system 178 may be mounted on the base support 24 of the conveyor 20. In a further embodiment, the phase adjustment may be effected by rotating the speed reducer 198 as opposed to the speed reducer 196 as illustrated, or alternatively, a phase adjustment system by be connected to each of the speed reducers 196, 198. In another embodiment, a mechanical actuating device may be attached to the lever arm 216 to permit the housing 211 of the speed reducer 196 to be rotated by the actuator and held in position indefinitely. Such a mechanical actuating device may be an electric linear actuator; and may include a braking device in place of the locking system of FIG. 10, that is, the flange 208, screw 212 and locking nut 214. The invention, therefore, in its broadest aspects, is not limited to the specific detail shown and described. Consequently, departures may be made from the details described herein without departing from the spirit and scope of the claims which follow:

What is claimed is:

1. A vibratory conveyor drive for imparting a displacement to a conveyor trough with respect to a conveyor base to convey material along the trough, the conveyor drive comprising:
    a first motor and rotating eccentric mounted to the base;
    a second motor and rotating eccentric mounted to the trough;
    a link rotatably connected between the first and second eccentrics to impart an angular displacement of the first eccentric to the second eccentric and to cause the second eccentric to impart a working displacement to the conveying trough as a function of an angular phase relationship between the first and the second eccentrics; and
    a synchronizer operatively connected to the first and second eccentrics for selectively adjusting the angular phase relationship between the first and the second eccentrics to correspondingly vary the working displacement imparted to the conveyor and in turn, vary a conveying velocity of the material in the trough.

2. A vibratory conveyor drive for imparting a displacement to a conveyor trough with respect to a conveyor base to convey material along the trough, the conveyor drive comprising:
    a first crank rotatably mounted to the base and having a first point of eccentricity at a first radius and moving through a first angular displacement;
    a second crank rotatably mounted to the trough and having a second point of eccentricity at a second radius on the second crank;
    a link rotatably connected between the first and second points of eccentricity for causing the first crank to impart the angular displacement to the second crank and the second crank to impart a working displacement to the conveying trough as a function of an angular phase relationship between the first and the second cranks; and
    a synchronizer operatively connected to the first and second cranks for selectively adjusting the angular phase relationship between the first and the second cranks to correspondingly vary the working displacement imparted to the conveyor and in turn, vary a conveying velocity of the material in the trough.

3. A vibrating conveyor having a variable conveying velocity comprising:
    a conveying trough;
    a base;
    a spring system connecting the trough to the base; and
    a drive system connected between the trough and the base for imparting two harmonic displacements to the conveying trough, the drive system including
        a first motor driven eccentric mounted to the conveying trough for producing a first harmonic displacement,
        a second motor driven eccentric mounted to the base for producing a second harmonic displacement,
        a link rotatably connected between the eccentrics; and
    a synchronizer operatively connected to the motor driven eccentrics for selectively adjusting an angular phase relationship between the first and the second eccentrics to correspondingly vary a working displacement imparted to the conveyor and in turn, vary the conveying velocity.

4. A vibrating conveyor having a variable conveying velocity comprising:
    a conveying trough;
    a base;
    a spring system connecting the trough to the base; and
    a drive system connected between the trough and the base including
        a rotating first eccentric mounted to the base with respect to a first axis of rotation,
        a rotating second eccentric mounted to the conveying trough with respect to a second axis of rotation,
        a link rotatably connected between the first and second eccentrics for causing the second eccentric to impart a working displacement to the conveying trough as a function of an angular phase relationship between the rotating first and the second eccentrics, and
        a synchronizer operatively connected to the first and second eccentrics for selectively adjusting the angular phase relationship between the rotating first and second eccentrics to correspondingly vary the working displacement imparted to the conveyor, thereby changing the conveying velocity.

5. The vibrating conveyor of claim 4 wherein the base is supported by a surface.

6. The vibrating conveyor of claim 5 further comprising:
    a reactive member; and
    an isolation spring system located between the reactive member and the surface.

7. The vibrating conveyor of claim 6 wherein the spring system further comprises leaf springs supporting the trough with respect to the base.

8. The vibrating conveyor of claim 4 further comprising a motor operatively connected to the first eccentric to rotate the first eccentric about a first axis of rotation.

9. The vibrating conveyor of claim 8 further comprising a motor operatively connected to the second eccentric to rotate the second eccentric about the second axis of rotation.

10. The vibrating conveyor of claim 9 wherein the motor operatively connected to the first eccentric is a first motor.

11. The vibrating conveyor of claim 10 wherein the motor operatively connected to the second eccentric is a second motor.

12. The vibrating conveyor of claim 9 wherein the motor operatively connected to the first eccentric is a first motor and the motor operatively connected to the second eccentric is also the first motor.

13. The vibrating conveyor of claim 9 wherein one end of the link is rotatably coupled to the first eccentric at a predetermined radial distance from the first axis of rotation.

14. The vibrating conveyor of claim 13 wherein the other end of the link is rotatably coupled to the second eccentric at a predetermined radial distance from a second axis of rotation.

15. The vibrating conveyor of claim 4 further comprising a resilient spring system operatively connected between the eccentrics.

16. The vibrating conveyor of claim 15 wherein the resilient spring system is operatively connected in series with the link between the eccentrics.

17. The vibrating conveyor of claim 16 wherein the link is comprised of two links and the resilient spring system is operatively connected between the two links.

18. The vibrating conveyor of claim 17 wherein one end of each of the two links is connected to one of the eccentrics and opposite ends of the two links are connected to the resilient spring system.

19. The vibrating conveyor of claim 4 wherein the synchronizer further comprises:
   a first powered shaft connected to the first eccentric to provide rotation to the first eccentric;
   a second powered shaft connected to the second eccentric to provide rotation to the second eccentric; and
   a phase angle adjustment system operably connected to the first and second powered shafts to adjust the angle phase relationship between the first and second powered shafts.

20. The vibrating conveyor of claim 19 wherein the first powered shaft is an output shaft of a first speed reducer and the second powered shaft is an output shaft of a second speed reducer.

21. The vibrating conveyor of claim 20 wherein the first and second speed reducers have respective input shafts operatively connected to a drive motor.

22. The vibrating conveyor of claim 21 wherein one of the speed reducers has a housing and the phase angle adjustment system comprises a mount for rotatably supporting the housing of the one of the speed reducers.

23. The vibrating conveyor of claim 22 wherein the phase angle adjustment system further comprises a device to rotate the housing of the one of the speed reducers to a desired angular position with respect to the mount.

24. The vibrating conveyor of claim 23 wherein the phase angle adjustment system further comprises a clamp for holding the housing of the one of the speed reducers at the desired angular positions with respect to the mount.

25. The vibrating conveyor of claim 4 wherein the synchronizer further comprises an electronic motor control connected to the motors for
   synchronizing the speeds of the motors to rotate the first and the second eccentrics at velocities to provide the first and the second angular displacements, and
   selectively adjusting a rotational phase of one of the motors with respect to the other of the motors to correspondingly vary the phase between the first and the second eccentrics, thereby changing the conveying velocity.

26. The vibrating conveyor of claim 25 wherein the electronic motor control further comprises:
   a first feedback signal generator responsive to the first motor rotating the first shaft and producing
      a first position feedback signal as a function of an angular position of the first shaft, and
      a first speed feedback signal as a function of an angular speed of the first shaft;
   a second feedback signal generator responsive to the second motor rotating the second shaft and producing
      a second position feedback signal as a function of an angular position of the second shaft, and
      a second speed feedback signal as a function of an angular speed of the second shaft; and
   a motor controller electrically connected to the first and second feedback signal generators and the second motor, the motor controller operating the second motor as a function of the angular position and the angular speed of the first shaft, thereby moving the material along the conveyor structure at a desired velocity.

27. The vibrating conveyor of claim 26 wherein the first position feedback signal represents the first shaft moving past a first reference position, and the second position feedback signal represents the second shaft moving past a second reference position.

28. The vibrating conveyor of claim 27 wherein the motor controller operates the second motor as a function of a predetermined angular displacement between the first shaft moving past the first reference position and the second shaft moving past the second reference position.

29. The vibrating conveyor of claim 25 wherein the motor controller comprises:
   a phase controller having
      a first input for selectively providing an input signal representing the desired angular displacement,
      second inputs responsive to the first, second, third and fourth feedback signals, and
      an output providing an output signal representing a desired angular speed of the second motor; and
   a speed control having an input connected to the output of the phase control and an output for operating the second motor to rotate the second shaft at an angular speed substantially equal to the angular speed of the first shaft.

30. The vibrating conveyor of claim 29 further comprising a motor controller electrically connected to the first motor and operating the first motor at a first predetermined speed.

31. The vibrating conveyor of claim 30 wherein the motor controller electrically connected to the first motor further has an input for selectively setting the first predetermined speed.

32. A method of operating an electronically synchronized conveyor drive operatively connected to a conveyor for moving material along the conveyor at a desired speed and direction, the conveyor having a first motor and rotating crank mounted on a base and a second motor and rotating crank mounted to a conveying trough, the first and second cranks having a link pivotally connected thereto, the method comprising the steps of:
   operating the first and second motors associated with the first and second cranks, respectively, at predetermined speeds with an electronic motor controller;
   producing first and second position feedback signals to the motor controller representing angular positions of the first and second cranks, respectively;
   producing first and second speed feedback signals to the motor controller representing angular speeds of the first and second cranks, respectively;
   providing a first input signal to the motor controller representing a desired angular relationship between the first and the second cranks, the desired angular relationship being correlated to a desired direction of motion of the material on the vibrating conveyor;

operating the second motor with the motor controller at the predetermined speed to provide the desired angular relationship between the first and the second cranks.

33. The method of claim 32 wherein the steps of providing the first and second position feedback signals comprises providing the first and second position feedback signals as a function of the rotation of the first and the second cranks past first and second angular reference positions, respectively, within one revolution of the respective first and second shafts.

34. A vibratory conveyor drive for imparting a displacement to a conveyor trough with respect to a conveyor base to convey material along the trough, the conveyor drive comprising:

- a first eccentric rotatably mounted on the base;
- a second eccentric rotatably mounted on the trough;
- a rigid link rotatably connected between the first and second eccentrics to impart an angular displacement of the first eccentric to the second eccentric and to cause the second eccentric to impart a working displacement to the conveying trough as a function of an angular phase relationship between the first and the second eccentrics; and
- a synchronizer operatively connected to the first and second eccentrics for selectively adjusting the angular phase relationship between the first and the second eccentrics to correspondingly vary the working displacement imparted to the conveyor and in turn, vary a conveying velocity of the material in the trough.

35. A vibrating conveyor having a variable conveying velocity comprising:

- a conveying trough;
- a base;
- a spring system connecting the trough to the base; and
- a drive system connected between the trough and the base including
  - a rotating first eccentric mounted to the base with respect to a first axis of rotation,
  - a rotating second eccentric mounted to the conveying trough with respect to a second axis of rotation,
  - a link including rotatably connected between the first and second eccentrics for causing the second eccentric to impart a working displacement to the conveying trough as a function of an angular phase relationship between the rotating first and the second eccentrics,
  - a resilient spring system operatively connected with the link between the eccentrics, and
  - a synchronizer operatively connected to the first and second eccentrics for selectively adjusting the angular phase relationship between the rotating first and second cranks to correspondingly vary the working displacement imparted to the conveyor, thereby changing the conveying velocity.

* * * * *

UNITED STATES PATENT AND TRADEMARK OFFICE
CERTIFICATE OF CORRECTION

PATENT NO. : 5,979,640
DATED : November 9, 1999
INVENTOR(S) : William A. Horton

It is certified that error appears in the above-identified patent and that said Letters Patent is hereby corrected as shown below:

Column 2, line 9 reads "for varying the and speed" and
should read --for varying the speed --.

Column 2, line 63 reads "motor at a speed to
provide" and should read--motor to provide--.

Column 5, line 5 reads "a desired a desired phase" and
should read--a desired phase--.

Column 11, line 18 reads "system by be connected" and
should read--system be connected--.

Claim 35, line 12 reads "including rotatably connected
between" and should read--rotatably connected between--.

Signed and Sealed this

Twenty-second Day of May, 2001

Attest:

NICHOLAS P. GODICI

Attesting Officer

Acting Director of the United States Patent and Trademark Office